United States Patent [19]
Dezonno et al.

[11] Patent Number: 5,910,983
[45] Date of Patent: Jun. 8, 1999

[54] APPARATUS AND METHOD FOR IDENTIFYING RECORDS OF OVERFLOWED ACD CALLS

[75] Inventors: Anthony J. Dezonno, Chicago; Roger A. Sumner, Batavia; James J. Bryla, Naperville, all of Ill.

[73] Assignee: Rockwell Semiconductor Systems, Inc., Newport Beach, Calif.

[21] Appl. No.: 08/858,601

[22] Filed: May 19, 1997

[51] Int. Cl.⁶ ................................................ H04Q 3/64
[52] U.S. Cl. ........................ 379/266; 379/265; 379/309
[58] Field of Search .................................. 379/265, 266, 379/309, 219, 220, 221, 242, 243, 111, 112, 113, 114, 115

[56] References Cited

U.S. PATENT DOCUMENTS

| | | | |
|---|---|---|---|
| 4,289,934 | 9/1981 | Pitroda et al. | 179/27 D |
| 4,400,587 | 8/1983 | Taylor et al. | 379/113 |
| 4,737,983 | 4/1988 | Frauenthal et al. | 379/265 |
| 4,979,171 | 12/1990 | Ashley | 370/110.2 |
| 5,127,004 | 6/1992 | Lenihan et al. | 370/110.2 |
| 5,268,903 | 12/1993 | Jones et al. | 370/110.1 |
| 5,335,269 | 8/1994 | Steinlicht | 379/266 |
| 5,365,581 | 11/1994 | Baker et al. | 379/196 |
| 5,384,841 | 1/1995 | Adams et al. | 379/266 |
| 5,469,504 | 11/1995 | Blaha | 379/265 |
| 5,500,891 | 3/1996 | Harrington et al. | 379/265 |
| 5,526,416 | 6/1996 | Dezonno et al. | 379/265 |
| 5,544,232 | 8/1996 | Baker et al. | 379/88.25 |
| 5,546,456 | 8/1996 | Vilsoet et al. | 379/265 |
| 5,724,419 | 3/1998 | Harbuziuk et al. | 379/265 |
| 5,740,238 | 4/1998 | Flockhart et al. | 379/265 |
| 5,740,240 | 4/1998 | Jolissaint | 379/265 |
| 5,754,639 | 5/1998 | Flockhart et al. | 379/265 |

Primary Examiner—Krista Zele
Assistant Examiner—Scott Wolinsky
Attorney, Agent, or Firm—Welsh & Katz, Ltd.

[57] ABSTRACT

A method and apparatus are provided for identifying a call record by a source automatic call distributor to a host computer of a telephone call received from a PSTN and overflowed from the source automatic call distributor to a destination automatic call distributor in a call distribution system using telescripted call control. The call record is stored under a call identifier of the source automatic call distributor in a memory of a host computer serving both the source automatic call distributor and the destination automatic call distributor. The method comprises the steps of executing a telescript sequence by the source automatic call distributor which sends a call identifer assigned by the source automatic call distributor and an identifer of the source automatic call distributor to a call overflow identification table of the host and transferring the call to the destination automatic call distributor along with the call identifier of the source automatic call distributor.

48 Claims, 5 Drawing Sheets

APPARATUS AND METHOD FOR IDENTIFYING RECORDS OF OVERFLOWED ACD CALLS

FIELD OF THE INVENTION

The field of the invention relates to automatic call distribution systems and in particular to tracking of calls overflowed from one automatic call distributor to another automatic call distributor.

BACKGROUND OF THE INVENTION

Automatic call distribution systems are known. Such systems are typically used as a means of distributing telephone calls among a group of agents of an organization. While the automatic call distributor (ACD) may be a separate part of a private branch telephone exchange (PBX), often the ACD is integrated into and is an indistinguishable part of the PBX.

Often the organization disseminates a single telephone number to its customers and to the public in general as a means of contacting the organization. As calls are directed to the organization from the public switched telephone network (PSTN), the automatic call distribution system directs the calls to its agents based upon some algorithm, typically based upon availability. For example, where all agents are considered equal, the ACD may distribute the calls based upon which agent position (telephone) has been idle the longest time.

In order to distribute incoming calls from the PSTN to the available agents, the interaction of a controlling computer with a switching fabric of the PBX and ACD becomes essential. Often a connection to a local PSTN is in the form of a number of trunk connections. Each of the trunk connections is monitored by the controller for incoming calls. Where a call is detected, the controller searches for and selects an idle agent. Upon selecting an agent, the controller commands the switch to form a connection between the incoming trunk and selected agent.

In more complicated systems, the organization may use a number of telephone numbers to identify different individuals and functions within the organization. Each telephone number may be assigned to a particular incoming trunk or group of incoming trunk lines. As such, the controller may be required to recognize a call target based upon an identity of an incoming trunk line and route the call accordingly.

In other systems, the ACD of an organization may receive calls directed to different call targets over the same trunk lines. In such a case, the call target may be identified to the ACD by a pulse code modulated (PCM) signal transferred from the PSTN to the controller of the ACD by a dialed number identification service (DNIS) operating from within the PSTN.

In systems associated with service organizations, where many calls are received and handled by many agents, it may be important for an agent to have ready access to customer files. In such a situation, a database is maintained of existing customers. Customer records may be displayed on agent terminals as the agents converse with specific customers. In some cases, the customer may be identified to the database for display of records on the terminal by the agent entering a customer identifier into a keyboard associated with the terminal. Alternatively, the controller of the ACD may transfer an identifier of the customer to the database based upon an automatic number identification (ANI) facility, operating from within the PSTN.

Where ANI is used, the controller of the ACD receives the ANI digits (identifying the caller via the caller's telephone number) at the same time the call arrives from the PSTN. Upon selecting an agent, the controller may transfer the call to a queue for the selected agent or directly to the selected agent. At the same time that the call is delivered to the agent, the controller sends an identifier of the selected agent and ANI number of the customer to a controller of the database (the host). The host, in turn, displays the customer records via a computer monitor of the selected agent at the same time the call is delivered.

As a further feature, calls may be transferred among agents. Where a first agent finds that he or she cannot help a particular customer, the agent may activate a key on a keyboard of the agent and enter an identity of another agent or agent group that may be better able to help the customer. The controller of the ACD may immediately connect the call to the newly identified agent, or may place the call in a queue until the identified agent becomes available.

In either case, the controller transfers a message to the host identifying the previous and newly identified agent. Since the host knows the identity of the customer displayed at the terminal of the previous agent, the host may now display those same customer records at the terminal of the newly selected agent.

Where a call is placed in a queue, the ACD controller may monitor a total time that the call has been in the queue. Where the time exceeds a threshold value, the controller may transfer (overflow) the call to a newly selected agent at another less heavily loaded ACD (overflow ACD) within the same organization. The controller of the transferring ACD transfers DNIS and ANI information as well as a call sequence number assigned by the transferring ACD to the overflow ACD. The overflow ACD, upon receiving the call, transfers the information to the host including an identifier that the call is an overflow call. The host in turn then polls each ACD to identify the transferring ACD and any recently created call records generated by the transferring ACD.

While the existing method of ACD operation is relatively satisfactory, it is dependent upon a record of connection transactions as a method of identifying a call to the host. Where a connection to an agent is completed, a transaction identifier is sent to the host memorializing the transaction. The record of the connection is placed in a call record held in an area reserved for the transferring ACD. Where a call is received and placed in a queue for delivery to the next available agent, a call arrival message is sent to the host and saved in the transferring ACD's record area. Where the call is then transferred to another ACD, there is no means for directly identifying the call record created by the transferring ACD. As a consequence, the host must poll (i.e., search the call records of) each ACD to identify the call record of the call. Where a host serves many ACDs, a considerable amount of time may be lost searching for call records. Accordingly, a need exists for a better method of tracking overflow calls among ACDs.

SUMMARY

A method and apparatus are provided for identifying a call record by a source automatic all distributor to a host computer of a telephone call received from a PSTN and overflowed from the source automatic call distributor to a destination automatic call distributor in a call distribution system using telescripted call control. The call record is stored under a call identifier of the source automatic call distributor in a memory of a host computer serving both the source automatic call distributor and the destination automatic call distributor. The method comprising the steps of executing a telescript sequence by the source automatic call distributor which sends a call identifier assigned by the source automatic call distributor and an identifier of the source automatic call distributor to a call overflow identification table of the host and transferring the call to the destination automatic call distributor along with the call identifier of the source automatic call distributor.

DETAILED DESCRIPTION OF A PREFERRED EMBODIMENT

Figure 1:
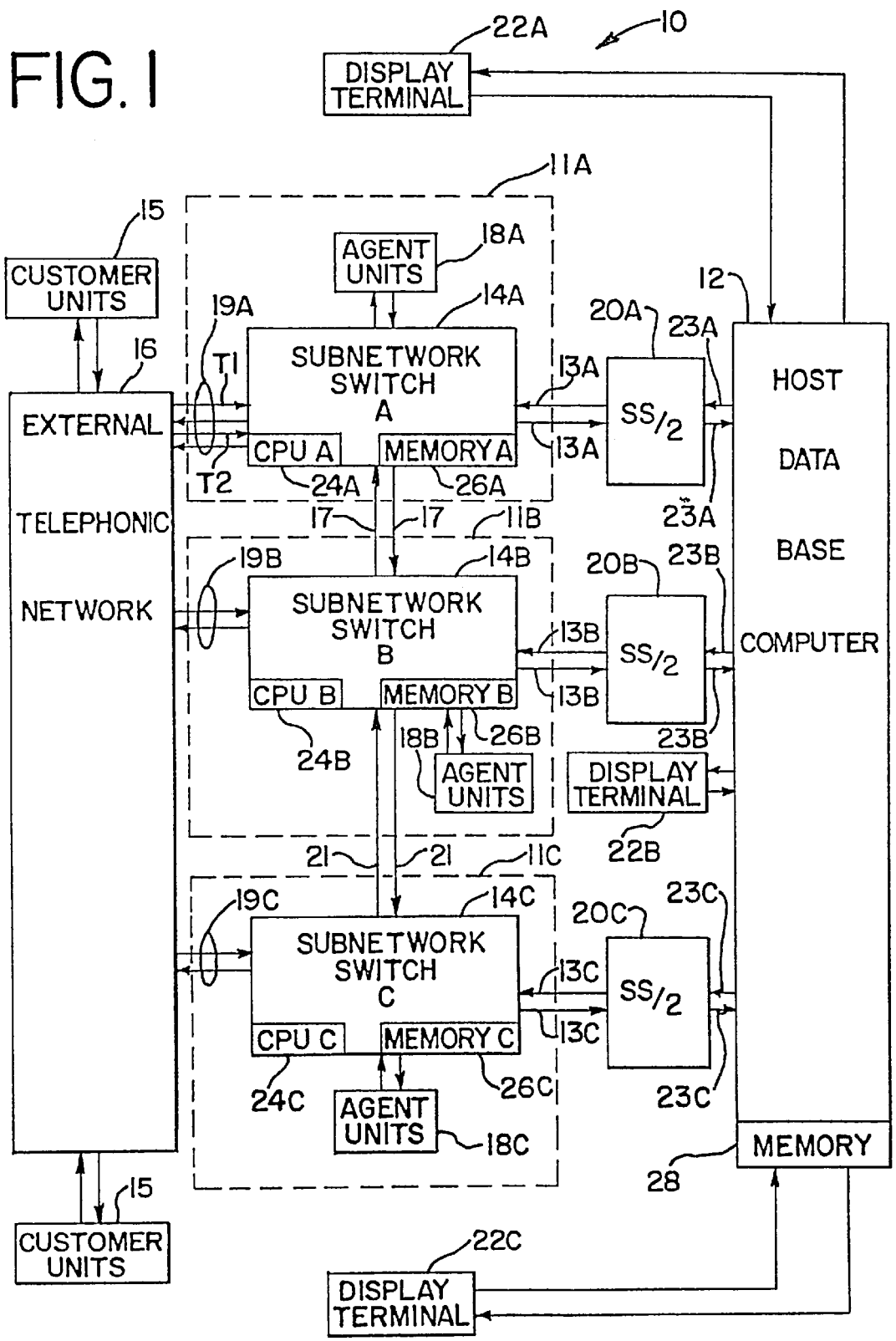
FIG. 1 depicts an automatic call distribution system in accordance with an embodiment of the invention.

FIG. 1 is a block diagram of an automatic call distribution (ACD) system 10 in accordance with an embodiment of the invention. ACDs similar to the type shown in FIG. 1 may be available from any of a number of manufacturers (e.g., the Spectrum Automatic Call Distribution system made by Rockwell International Corporation of Seal Beach, Calif.).

Figure 2:
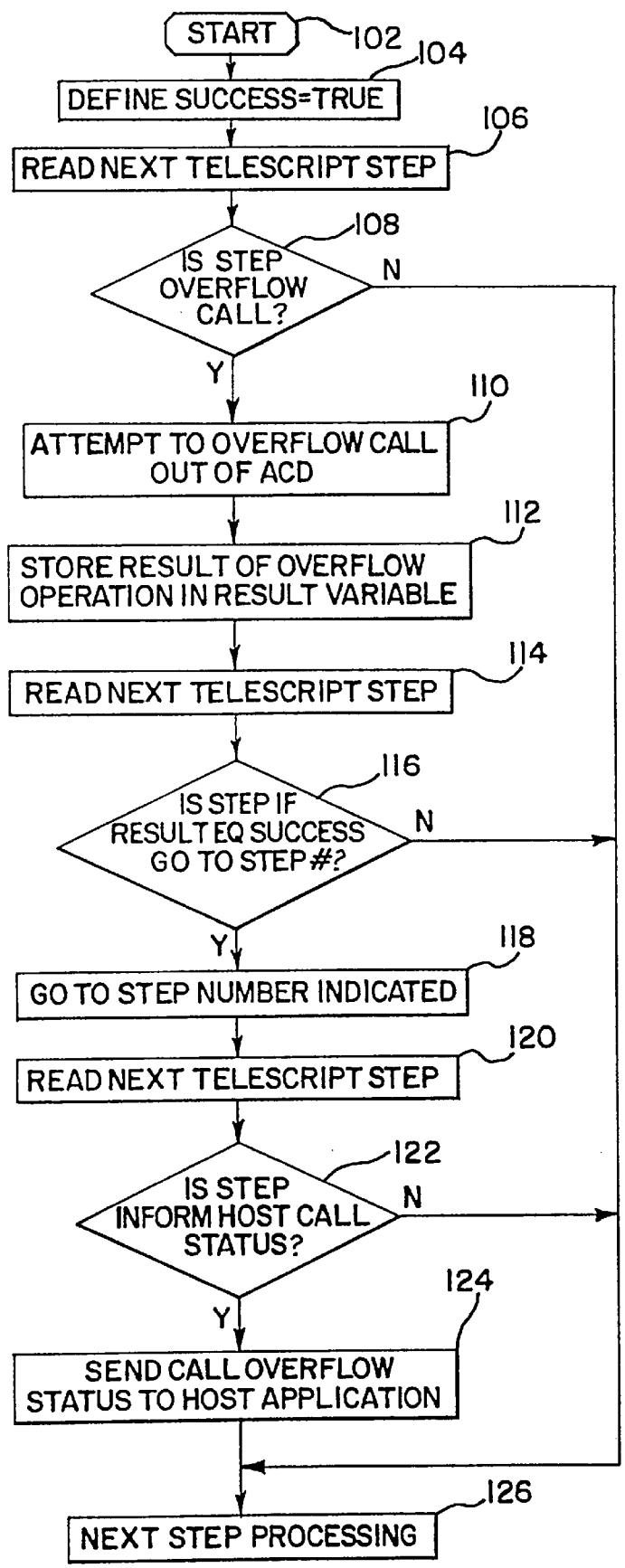
FIG. 2 is a flow chart depicting the process of the system of FIG. 1.
Figure 3:
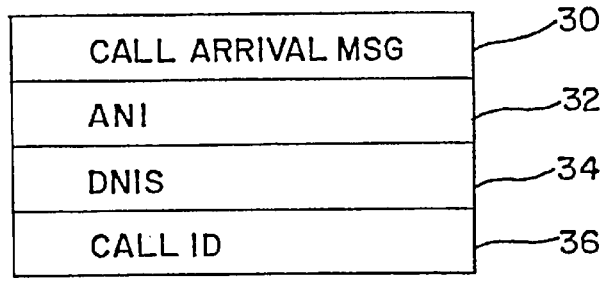
FIG. 3 depicts a call arrival message used by the system of FIG. 1.
Figure 4:
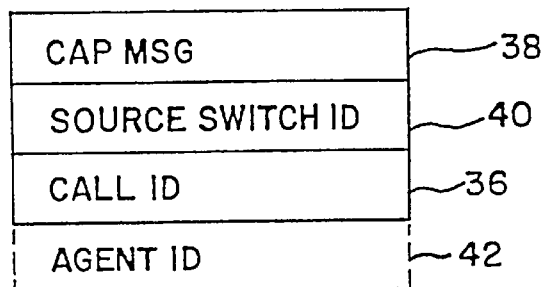
FIG. 4 depicts a call action provided message of the system of FIG. 1.
Figure 5:
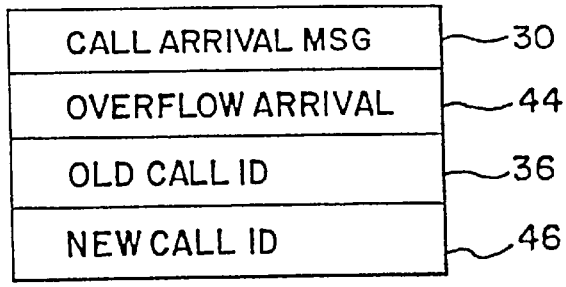
FIG. 5 depicts an overflow arrival message of the system of FIG. 1.
Figure 6:
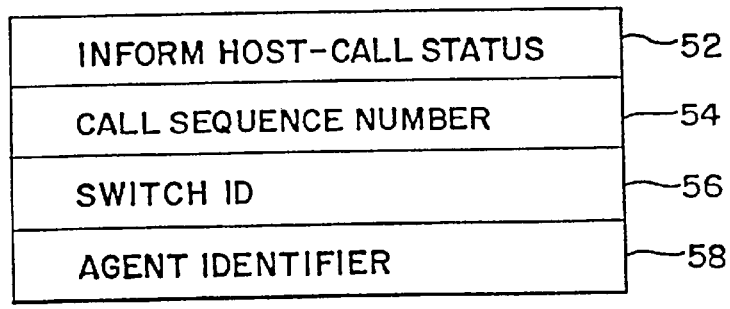
FIG. 6 depicts an inform host of call status message of the system of FIG. 1.
Figure 7:
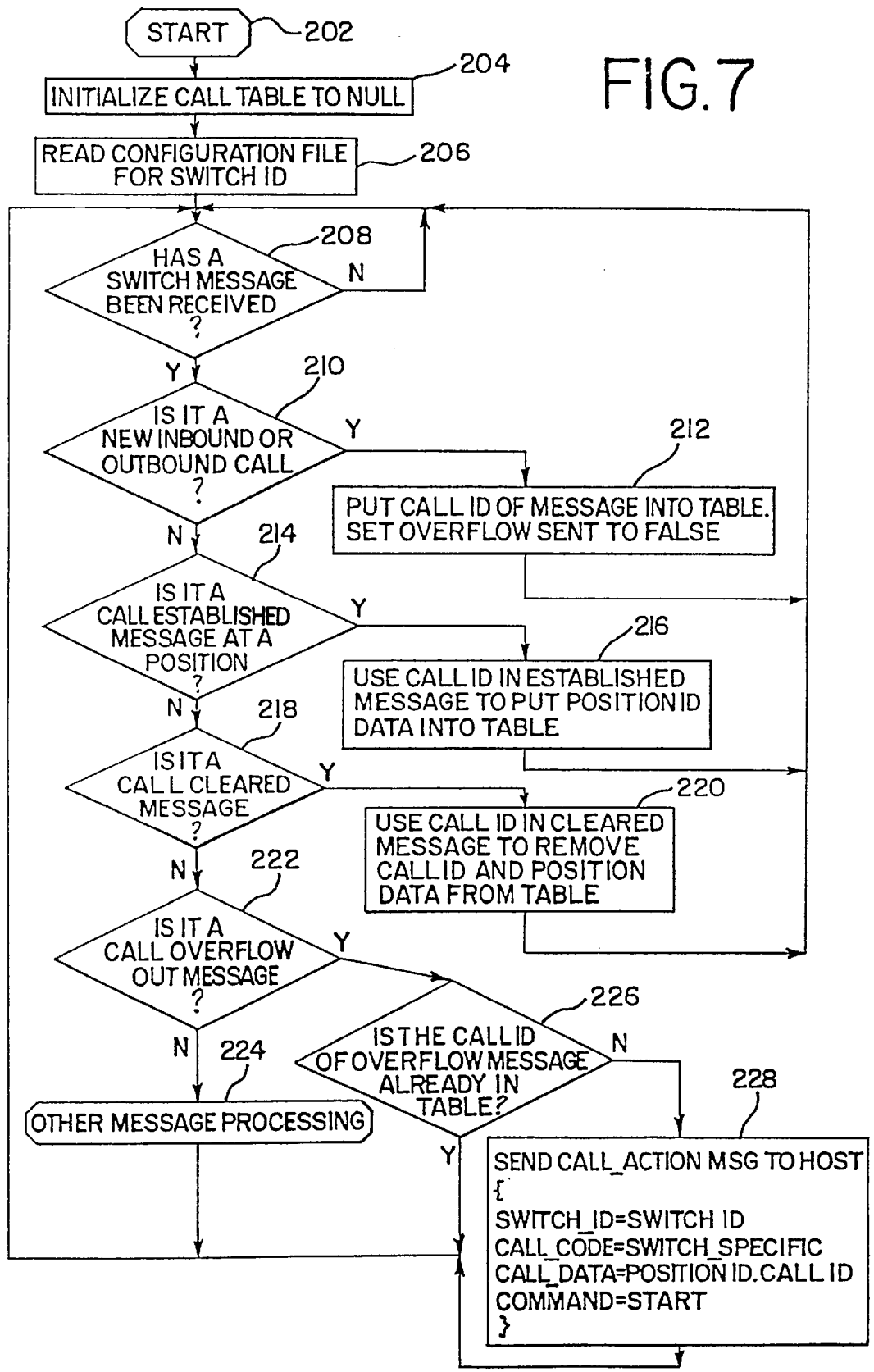
FIG. 7 is a flow chart of processing of the call action provided message of FIG. 4.
Figure 8:
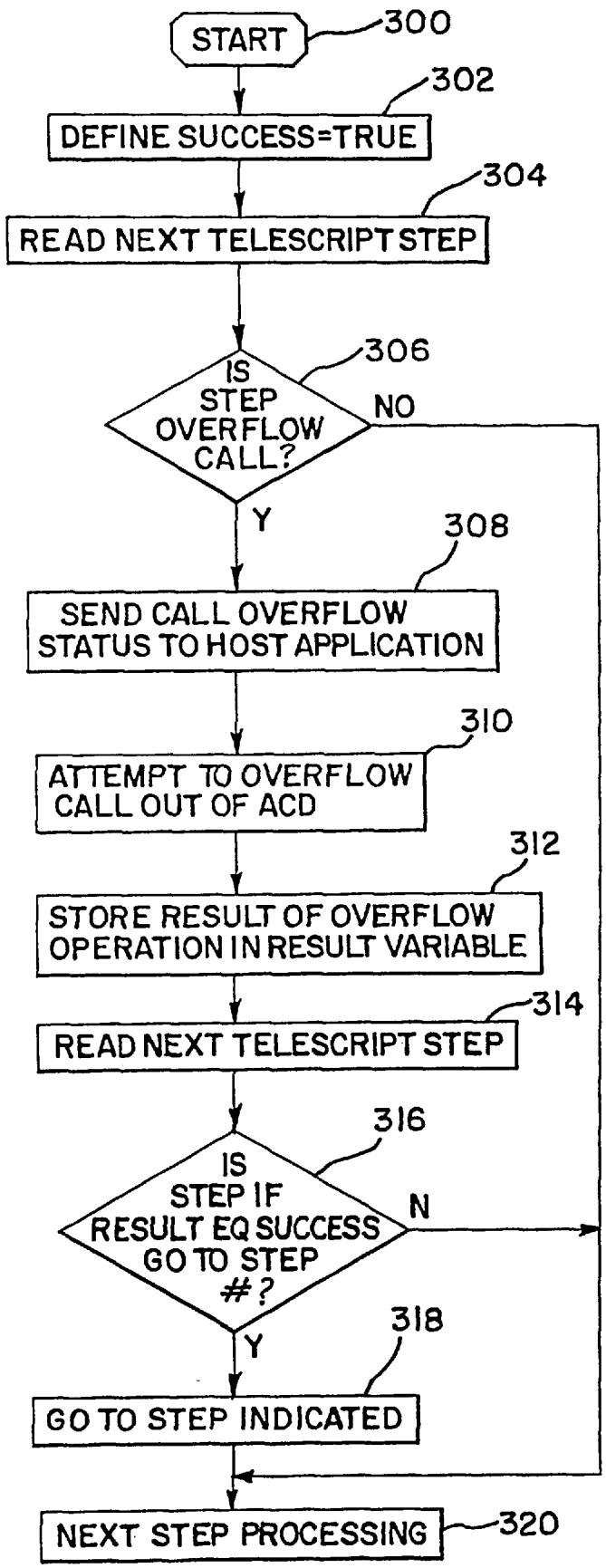
FIG. 8 is a flow chart of processing of the call status message of FIG. 5.

FIGS. 2, 7 and 8 are a flow charts of processes of the system 10 of FIG. 1. FIGS. 3–6 are examples of formats that may be used for messages exchanged by the system 10. Reference shall be made to FIGS. 1–8 as appropriate to an understanding of the invention.

Under the embodiment, a first, second and third internal ACD networks 11A, 11B, 11C are connected to a host database computer 12 and the PSTN 16. Internal networks 11A, 11B, 11C may be located at geographically diverse locations and may be interconnected one-to-another by an appropriate interconnecting group of private ISDN lines 17, 21 (e.g., leased lines, virtual private lines, microwave links, etc.). Similarly, the internal networks 11A, 11B, 11C may be interconnected with the host 12 through a SwitchServer/2 (SS/2) 20A, 20B, 20C available from IBM and Rockwell International and an appropriate physical data link 13A, 13B, 13C, 23A, 23B, 23C (e.g., leased lines, virtual private lines, microwave link, the Internet, digital packet switching, etc.).

The SwitchServer/2 (provided to facilitate interconnection of the networks 11A, 11B, 11C with the host 12) may be an IBM compatible ISA PC with a Pentium 120 MHZ processor, or higher, having 16 Mbyte RAM, 125 Mbyte fixed disk and an IBM X.25 Interface Co-Processor/2. An IBM X.25 Interface Co-Processor/2 Cable Option V.24 may be used as an interface with the networks 11A, 11B, 11C. Ethernet or Token Ring Interface cards may be necessary depending upon the configuration of the ACD system 10.

Software for the SwitchServer/2 may be provided using the IBM Operating System/2 (OS/2) Version 3.1 with Communications Manager/2 Version 1.1 or later. An IBM Local Area Protocol Support (LAPS) may be used for support and control of the LAN interface.

The internal networks 11A, 11B, 11C may be connected to the PSTN 16 through a number of trunk lines 19A, 19B, 19C. The PSTN 16 may offer telephone service to the system 10 on trunk lines 19A, 19B, 19C in conjunction with a number of call-delivery features such as ANI and DNIS.

DNIS information supplied by the PSTN 16 is useful for the internal networks 11A, 11B, 11C where inbound calls to the internal networks 11A, 11B, 11C may be directed to any of a block of telephone numbers assigned to each of the internal networks 11A, 11B, 11C. This may be especially useful where the block of numbers to the internal network (e.g., 11A) is connected through the trunk lines 19A in rotary fashion, so that when the calling party from the PSTN appears, for example, on trunk T1, it can be determined whether the calling party was, in fact, calling the telephone number corresponding to trunk T1 or was, in fact, calling the telephone number corresponding to trunk T2 and was rotated down to the next available trunk, T1.

With regard to inbound calls, the switches 14A, 14B, 14C function to selectively interconnect calls from external customer units 15 of the external PSTN 16 to agents 18A, 18B, 18C of the internal networks 11A, 11B, 11C. As such, each switch 14A, 14B, 14C functions to distribute calls within its own internal network 11A, 11B, 11C.

The switches 14A, 14B, 14C are controlled by central processing units, or CPUs, 24A, 24B, 24C, in conjunction with peripheral memory devices 26A, 26B, 26C. Control of the switches 14A, 14B, 14C and communications with the host 12 and PSTN 16 may be accomplished generally as described in U.S. Pat. No. 5,268,903, and U.S. Pat. No. 5,140,611, both to Jones et al., and both incorporated herein by reference. Routing of calls to agents 18A, 18B, 18C and overflow of calls may be accomplished generally as described in: U.S. Pat. No. 5,335,269 to Steinlicht; U.S. Pat. No. 5,365,581 to Baker et al.; and U.S. Pat. No. 5,384,841 to Adams et al., all incorporated herein by reference.

During operation, the CPUs 24A, 24B, 24C monitor each port of the switch 14A, 14B, 14C for changes in status. A change in status may be an agent unit 18A, 18B, 18C going off-hook to make a call, an agent unit 18A, 18B, 18C hanging up after a call, or it may be a call alerting tone detected on a trunk 19A, 19B, 19C alerting the CPU 24A, 24B, 24C to the presence of an incoming call.

Where the status change is an agent 18A, 18B, 18C hanging up, the CPU 24A, 24B, 24C acts to tear-down the call connection within the switch 14A, 14B, 14C between the agent at a first port of the switch and a second party to the conversation communicating through a second port of the switch 14A, 14B, 14C. Upon tear down of the connection, the CPU 24A, 24B, 24C also sends a message to the host, notifying the host of termination of the call connection. The message to the host 12 would include at least the identity of the agent 18A, 18B, 18C.

Where the status change is an agent 18A, 18B, 18C going off-hook, the CPU 24A, 24B, 24C interprets such change as preparation for the placement of a telephone call. As such, the CPU 24A. 24B, 24C prepares to receive a set of dialed digits. Upon receiving the digits and if the digits are determined as being a call directed to an outside party, then the CPU 24A, 24B, 24C may seize an outgoing trunk line 19A, 19B, 19C and send a call alert followed by the dialed digits.

Where the alert is answered by a call connection acknowledgment, the CPU 24A, 24B, 24C completes the connection between the port of the agent (e.g., 18A, 18B, 18C) and the port of the seized trunk line.

If the call is directed to another agent 18A, 18B, 18C or some other party within the organization, then the CPU 24A, 24B, 24C may identify the port to which the calling party is to be connected by reference to a look-up table within memory 26A, 26B, 26C. Upon locating the party, the CPU 24A, 24B, 24C may then cause a connection to be set-up within the switch 14A, 14B, 14C between between appropriate external ports of the calling and called party.

Where the status change is a call alert signal on an incoming trunk line (or a control channel associated with an incoming trunk line), the CPU 24A, 24B, 24C may send an acknowledge message to the PSTN 16 accepting the call. The PSTN 16 may respond with the forwarding of DNIS and ANI messages, identifying the called number and calling party.

Upon accepting the call, the CPU 24A, 24B, 24C first stores the DNIS and ANI numbers in a termination table of the memory 26A, 26B, 26C. More specifically, the CPU 24A, 24B, 24C maintains a table of call information for each port of the switch 14A, 14B, 14C. Where a call is accepted on an incoming trunk line, the CPU 24A, 24B, 24C enters the DNIS and ANI number into the table for the incoming trunk line upon which the call is received.

In addition to updating the termination table within memory 26A, 26B, 26C, the CPU 24A, 24B, 24C also generates a call identifier (also sometimes referred to as a call ID or sequence number) for the call, unique to the switch 14A, 14B, 14C. The call identifier along with the ANI and DNIS numbers may then be sent to the host 12 as part of a call arrival message (shown in FIG. 3 as containing message elements 30, 32, 34 and 36). Delivery of the ANI and DNIS numbers and call identifier allows the host 12 to create a unique call record of the call in memory 28, in a call record area of memory 28 reserved for the switch 14A. The call record may then be used to retrieve customer records for delivery to an appropriate display terminal 22A, 22B, 22C once the call has been assigned to an agent 18A, 18B, 18C.

After receipt of the call from the PSTN 16, the CPU 24A, 24B, 24C, by reference to the DNIS number, determines the identity of agent 18A, 18B, 18C to which the call is to be assigned. For example, the DNIS number may be used to differentiate between calls directed to a first telephone number arriving on a first incoming trunk group directed to a sales group of the organization from calls directed to a service group of the organization. Since agents servicing sales calls would, in most cases, not handle calls directed to service, the DNIS number provides a convenient means of differentiating between two or more types of calls.

Upon determining the identity of the agent 18A, 18B, 18C (or group of agents) the CPU 24A, 24B, 24C instructs the switch 14A, 14B, 14C to internally connect the port of the incoming trunk to the port of the identified agents.

Where the call has been connected to an agent, the CPU 24A, 24B, 24C stores the port number of the identified agent in the termination table for the port of the incoming trunk. Likewise, the CPU 24A, 24B, 24C stores the port identifier of the incoming trunk in the termination table of the identified agent.

To complete set-up of the call to the identified agent, the CPU 24A, 24B, 24C sends a call completion message to the host 12. The call completion message includes at least a port identifier of the identified agent and the call identifier. The call identifier allows the host 12 to reference the original call record created by the host 12 upon receipt of the call arrival message. Since the call arrival record has a customer identifier (i.e., the ANI number), the port identifier allows the host 12 to deliver customer data to the specific display terminal 22A, 22B, 22C of the agent to which the call was delivered.

In the alternative, if all of the agents (e.g., 18A) were busy, then an incoming call (e.g., received on incoming trunk T1 of the first switch 14A) would be placed in a queue. While in the queue, the CPU 24A compares certain parameters of each call in the queue (e.g., time in the queue) with a set of overflow threshold values. Where the parameters of the queued call exceed one or more of the overflow threshold values, the call may be considered a candidate for overflow to another switch.

Control of call routing may be accomplished using a user accessible call control feature called telescripting. The use of telescripting allows a user to program call handling algorithms (vectors) that closely match the needs of the-user. Telescripts also allow for the creation of call control vectors that may be specially tailored for the ACD system 10. Telescripts may be used to direct calls to agent groups, voice response units (VRUs) and other call centers. Telescripts can also route calls based upon: 1) time of day; 2) day of week; 3) site-specific thresholds based upon calling and staff activity; and 4) network-provided call information such as ANI, DNIS and the identity of the incoming trunk group.

As an example, a simple routing telescript such as that shown in Table I may be used for the initial routing of calls as they are received from the network 16.

TABLE I

1. Retrieve Network
2. If Result Eq Success GoTo 4
3. Route Application 10
4. Translate DNIS
5. If Result Eq Success GoTo 7
6. Intercept Invalid_DNIS
7. Route Translation In the example, the switch 14A, 14B, 14C is instructed to collect DNIS digits from the network 16 in step 1. If it successfully receives the digits, control is passed in step 2 to step 4. If unsuccessful, the switch 14A, 14B, 14C sends the caller to a default application, in this case application 10. In step 4, the switch 14A, 14B, 14C tests for a valid DNIS number. If the DNIS number is not valid, the call is passed to step 6, which instructs the switch 14A, 14B, 14C to provide an invalid DNIS intercept message (using an intercept telescript called Invalid_DNIS) and, in this case, the call is disconnected (other possible conclusions could be provided). If the DNIS number is valid, the call is sent to an application telescript associated with the translated DNIS number.

Application telescripts are the specific series of processing steps an ACD call controller will take for handling of a particular task (i.e., for sending the call to sales, customer support, billing, etc.). Processing steps in an application telescript can transfer control of the call to a feature telescript (feature vector), intercept telescript (intercept vector) or any other application telescript. The application telescript may queue a call to as many as 10 agent groups simultaneously. Over 500 applications telescripts may be defined with the system 10, with as many as 200 steps per telescript.

As a part of call processing, one of the steps of the call routing vector may compare a current time of day with a predetermined time (e.g., 5 pm) and where the current time is after the predetermined time, the call routing vector may route the call to an overflow vector. In other cases, a time that the call remains in a queue is measured and, when it exceeds some threshold value, the call is overflowed to another ACD. Table II is an example of a telescript written to provide intelligent messaging as well as overflow when the call has been in the queue for a pre-determined time period.

TABLE II

1. Start Tone Ringback
2. Queue Agent Group 2
3. If Speed 2 GE 120 GoTo 8
4. Start Announcement 10*
5. Convert Speed 2 in Seconds
6. Play Announcement 12 **
7. GoTo 9
8. Play Announcement 35 ***
9. Delay 60
10. Queue Agent Group 13
11. Delay 60
12. If Speed 13 GE 120 GoTo Overflow
13. GoTo 11

In the example of Table II, the call is first queued to agent group 2. In step 3, the CPU 24A, 24B, 24C checks to see if the average speed of answer in agent group 2 is greater than 120 seconds. If it is, announcement 35 is played. Announcement 35 may be recorded as follows: "We estimate your call will be answered in more than two minutes. If you would like to wait, please stay on the line. Otherwise, please try back later."

If the average speed of answer in agent group 2 is not greater than 120 seconds, announcement 10 is started. There is a difference between the command "play" and "start". The "start" command permits the telescript to proceed to the next step before its action is completed. This permits message fragments to be strung together into a continuous stream. Announcement 10 may be recorded as: "We estimate your call will be answered in . . . " During announcement 10, system activity is checked in step 5 and an estimated time to call delivery is converted into seconds. The converted time is delivered by synthesizing and inserting the words "xx seconds" at the end of the verbal message give by announcement 10. Announcement 12 continues what is heard by the caller. Announcement 12 may be recorded as: "Please stay on the line and the next available agent will assist you."

Also present in step 12 is a provision to overflow the call when the time in the queue 13 exceeds 120 seconds. Within the telescript named OVERFLOW, special provisions may be made depending upon the identity of the caller. For example, the DNIS and/or ANI numbers may be used to vector the call to special routing instructions. If the ANI number associated with the call identifies the call as being from a customer that is entitled to a higher level of service, then the call may be routed to a facility equipped to service the call. If the call was received after 5 pm and the DNIS number indicated that the call was directed to a number which is to be manned 24 hours a day, then the call may be routed to a continuously manned facility.

In a case where overflow is indicated, the CPU (e.g., 24A) composes an INFORM HOST OF CALL STATUS message (50, FIG. 6) and sends the message over a transaction link (e.g., 13A) to the SS/2 (e.g., 20A). The call status message 50 may be composed by specific steps within the overflow telescript or may be composed by a special call status telescript sequence within the call handling telescript sequence.

Under an embodiment, the call status message 50 may be sent each time the CPU (e.g., 24A) of the first switch 14A attempts to overflow a call to another switch. Under another embodiment, the CPU 24A may send a call status message 50 only after successfully overflowing the call to another switch 14B, 14C.

In either case, the process of sending a call status message 50 may be understood by reference to the method steps 102, 104, 106, 108, 110, 112, 114, 116, 118, 120, 122, 124, 126 of the flow chart of FIG. 2 or the method steps 300, 302, 304, 306, 308, 310, 312, 314, 316, 318, 320 of the flow chart of FIG. 8. For example, the processing of step 12 of the example telescript of Table II (i.e., the calling of the overflow telescript) may generally be shown as process step 108 of FIG. 2, or 306 of FIG. 8. Reference will be made to FIGS. 2 and 8 as appropriate to an understanding of the processing of a call overflow.

The call status message 50 may include four fields. The first field 52 simply identifies the message to the SS/2 as being a call status message 50. The second field 54 contains the call ID number assigned by the CPU 24A upon receipt of the call from the network 16. The third field 56 contains an identifier of the switch 14A. The last field 58 is optional and would only contain information when the call has been previously answered by an agent 18A.

Turning now to the case where a call status message 50 is sent each time, the flowchart of FIG. 8 may be used as an example of the steps involved. As shown, for each telescript step, the CPU 24A checks 306 whether the step is an overflow step. If it is, the CPU 24A sends 308 an overflow message to the host application. The CPU 24A then transfers 310 an overflow request to another switch (e.g., 14B). If the result is successful 316 and the CPU 24A receives a transfer accepted message, the CPU 24A transfers the call 318. If the result is not successful 316, the CPU 24A repeats 320 the overflow step by sending an overflow request to another switch (e.g., 14C).

In the case where a call status message 50 is only sent once, the flowchart of FIG. 2 may may be used to describe the process. As shown, where an overflow telescript is detected 108, the CPU 24A attempts 110 to overflow the call. If the overflow attempt 110 is successful 116, the CPU 24A sends 124 a call status message to the host. If the overflow attempt was not successful, the CPU 24A selects another switch 14C and tries again.

In either case, upon receiving the call status message 50, the SS/2 20A, 20B, 20C sends a call action provided (CAP) message (FIG. 7) to the host 12. The CAP message is stored in a call overflow table in memory 28 for later reference in identifying the original call record created by the first switch 14A.

FIG. 7 is a flowchart of process steps 202, 204, 206, 208, 210, 212, 214, 216, 218, 220, 222, 224, 226, 228 which allow for transfer of the CAP message from the SS/2 20A, 20B, 20C to the host 12. As shown, the SS/2 (e.g., 20A constantly monitors 208 for messages from the switch 14A. Where the message is a new inbound or outbound call, the message is added 212 to a local call table. Where the message is a message indicating that a call has been established 214 at, or clear from 218, an agent position, the SS/2 20A similarly adds 216, or deletes 220, the infomation to a local table.

Where the message from the switch 14A is a call status message 50, the SS/2 first checks to see if the message has already been received 226. If it has, the message 50 is discarded. If not, the SS/2 20A composes and sends 228 a call action provided (CAP) message to the host 12.

Returning now to the transferring switch 14A, an example will now be provided of the process of call overflow from the first ACD 14A. In attempting 108 to overflow the call out of the ACD 14A, the CPU 24A retrieves an identity of the next overflow destination (e.g., switch 14B) from a stack within the CPU 24A and prepares to transfer an overflow request to the second switch 14B, through an ISDN facility 17. The overflow request transferred to the second switch 14B through a "D" channel of the ISDN 17 may include DNIS and ANI information, an identifier of the originating ACD, a call priority level and the call identifier used by the originating ACD. A header of the ISDN message identifies the destination ACD 14B to the telephone system 16 and ensures that the message is properly routed to the destination switch 14B.

Upon receiving and decoding the overflow request, the destination switch 14B may either accept the call, or reject the call. The switch 14B may accept the call if the length of its queue of other callers does not exceed some threshold value, or other programmable value.

If the switch 14B accepts the call, then the switch returns a call accept message through the ISDN 17. Upon receiving the call accept message, the CPU 24A of the switch 14A instructs the switch 14A to form a connection between the incoming trunk port (e.g., T1) and a "B" channel of the interconnect port 17 for purposes of transferring the call.

If the destination switch 14B did not accept the call, then the CPU 24A may retrieve the next potential overflow destination from the internal stack of the CPU 24A. The next overflow destination may be switch 14C. To execute the overflow, the CPU 24A may again seize an ISDN "D" channel and transfer an overflow request 112.

Upon receipt of the request by the third switch 14C, the CPU 24C may determine that it can accept the transfer and returns a transfer accepted message through the ISDN. Upon receiving the transfer accepted message, the CPU 24A of the first switch 14A instructs the switch 14A to form an internal connection between the port of the incoming trunk T1 and seized channel of the outgoing interconnect 17. The CPU 24A may also transfer a call connection request (i.e., switching instructions) to the second switch 14B over the seized interconnect 17 (or a control channel of the seized interconnect) using PCM (or some other appropriate communication protocol) requesting that the second switch 14B provide a connection to the third switch 14C.

Upon matching the call with the transfer request, the CPU 24C of the third switch 14C knows the agent group requested by the caller based upon the DNIS number contained within the call request. As a consequence, the third CPU 24C may place the call in a queue and, at an appropriate instant, connect the call to a selected agent 18C.

Further, the CPU 24C may also transfer the ANI digits of the caller to the host 12 for purposes of identifying customer records. The host 12, however, does not know if it was the second switch 14B that originated the transfer, or the first switch 14A. Further, since an identifier of the source ACD 14A is not available to the host 12, the host cannot yet identify the call record of the call first created by the first switch 14A.

The prior art has taught that for a host 12 to identify the source of the call transfer, a polling operation must be performed on the other switches. The polling may be performed by transferring a request to the host 12 requesting that each switch of the system 10 be polled to find out the identity of the switch 14A, 14B which directed a call transfer to the destination switch 14C at that instant the destination switch 14C received the transfer request. The polling operation may be carried out by the host 12 sequentially searching the call records of each ACD 14A, 14B, 14C.

Under the embodiment, the polling of switches 14A, 14B, 14C is avoided through the transfer of the call status message (FIG. 6) and CAP message (shown in FIG. 4 as containing message elements 38, 40, 36 and 42), both of which are used in the process of identifying transferred calls arriving at an overflow destination. The CAP message may be transferred to the host 12 before or immediately after the transfer of a call by the SS/2 20A of the transferring switch 14A. The CAP message is stored in an overflow table within a memory 28 of the host 12, in an area not associated with any particular switch 14A, 14B, 14C.

In the example given above of a call transferred from an incoming trunk T1, the CAP message to the host 12 includes at least two fields. The first field is an identifier 40 of the sending switch 14A. The second field is the call identifier 36 assigned by the source switch 14A. A third optional field 42 is provided for identification of an agent 18A, in the case where the call had been answer by an agent 18A and subsequently transferred.

When the destination switch 14C receives the call, the destination switch 14C assigns a new call identifier (new call ID) to the call. The destination switch 14C also sends a call arrival message (shown in FIG. 5 as containing message elements 30, 44, 36 and 46) to the host 12. In this case, however, the destination switch 14C does not have a sufficient number of data fields in the call arrival message to send both the source switch ID and call ID of the source ACD 14A. Instead, the destination switch 14C sends an indication 44 that the call is an overflow call, the call identifier 36 of the source switch 14A along with the new call ID 46 of the destination switch. The host 12 uses the call identifier 36 as an address pointer for locating the call record. An address pointer, as such term is used in the art, is a relative address used by a computer to locate another address.

Upon receiving the call arrival message from the destination switch 14C, the host 12 searches an overflow table in memory 28 of the host 12 for the call identifier 36 assigned by the source switch 14A. Upon entering the overflow table using the old call ID 36, the host 12 is able to retrieve an identifier of the source ACD 14A. Upon identifying the source ACD 14A, the host 12, in turn, is able to access the call records of the source ACD 14A for purposes of identifying the call record of the overflowed call. Upon identifying the call record, the host 12 is able to retrieve the call record, including the ANI 32 of the customer, the DNIS number and any data entered by any answering agent.

Upon retrieving the call file, the host 12 is able to transfer the call record to the memory area reserved for the destination switch 14C. When the call is delivered to a selected agent 18C, the call record may now be used by the host 12 to simultaneously deliver a full set of customer records to the terminal display 22C of the selected agent 18C.

The use of the call status messages improves the efficiency of overflow operation by allowing the host 12 to directly identify call records without the processor intensive process of searching call files of each switch. The use of the call status message from the transferring ACD also provides the host 12 with a means for identifying overflow calls on an exception basis rather than requiring a modification of the structure of the call arrival message, at least one of which must be transmitted to the host with the arrival of each call.

A specific embodiment of a method and apparatus of overflowing calls according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

We claim:

1. A method of providing an address pointer to a host computer for locating a call record of a telephone call received from a public switched telephone network (PSTN) and overflowed from a source automatic call distributor to a destination automatic call distributor in a call distribution system using telescripted call control, the call record having been stored under a call identifier of the source automatic call distributor in a memory of the host computer serving both the source automatic call distributor and the destination automatic call distributor, such method comprising the steps of:

determining that a set of attributes of the telephone call meet an overflow criteria; and when the overflow criteria is determined to have been met, executing a call status telescript sequence by the source automatic call distributor which enters a call identifier and a source identifier of the source automatic call distributor into a call overflow identification table of the host computer.

2. The method as in claim 1 further comprising the step of transferring an overflow request over an integrated services digital network (ISDN) facility from the source automatic call distributor to the destination automatic call distributor including the call identifier of the source automatic call distributor.

3. The method as in claim 1 further comprising the step of transferring an overflow accept response from the destination automatic call distributor to the source automatic call distributor over an integrated services digital network (ISDN) facility.

4. The method as in claim 1 further comprising the step-of overflowing the call over a private line between the source and destination automatic call distributors.

5. The method as in claim 1 further comprising the step of transferring a call arrival message from the destination automatic call distributor to the host computer including the call identifier of the source automatic call distributor.

6. The method as in claim 1 further comprising the step of searching the overflow table using the call identifier of the source automatic call distributor to locate the identifier of the source automatic call distributor.

7. The method of claim 6 wherein the step of locating the call record using the call identifier and located identifier of the source automatic call distributor further comprises the step of searching an area of the memory reserved for the source automatic call distributor for the call record stored under the call identifier of the source automatic call distributor.

8. The method of claim 1 further comprising the steps of receiving the telephone call from the PSTN at the source automatic call distributor, assigning the call identifier to the call and placing the call in a call queue.

9. The method of claim 8 wherein the step of placing the call in a call queue further comprises the step of selecting the call queue from a plurality of call queues.

10. The method of claim 8 further comprising the step of receiving call associated data from the PSTN.

11. The method as in claim 10 further comprising the step of storing the call associated data in a termination table of the source automatic call distributor.

12. The method of claim 10 further comprising the step of transferring a call arrival message to the host computer including the call associated data received from the PSTN.

13. The method of claim 12 further comprising the step of creating the call record in the memory reserved for the source automatic call distributor, the call record including at least the call associated data of the call arrival message.

14. The method of claim 10 wherein the step of receiving call associated data from the PSTN further comprises the step of receiving an output of an automatic number identification service as call associated data from the PSTN.

15. The method of claim 14 further comprising the step of selecting a call queue of a plurality of call queues based upon the output of the automatic number identification service.

16. The method of claim 10 wherein the step of receiving call associated data further comprises the step of receiving an output of a dialed number identification service from the PSTN.

17. The method of claim 16 further comprising the step of selecting a call queue of a plurality of call queues based upon the output of the dialed number identification service.

18. The method of claim 1 further comprising the step of measuring a set of call parameters and determining that the call has met a call overflow criteria.

19. Apparatus for providing an address pointer to a host computer for a call record of a telephone call received from a public switched telephone network (PSTN) and overflowed from a source automatic call distributor to a destination automatic call distributor in a call distribution system using telescripted call control, the call record having been stored under a call identifier of the source automatic call distributor in a memory of the host computer serving both the source automatic call distributor and the destination automatic call distributor, such apparatus comprising:

means for determining that a call attribute of the call has exceeded an overflow parameter; and means, coupled to the means for determining, for executing a call status telescript sequence by the source automatic call distributor when the means for executing determines that the call attribute exceeds the overflow parameter, said telescript sequence being adapted to enter a call identifier assigned by the source automatic call distributor and an identifier of the source automatic call distributor into a call overflow identification table of the host computer.

20. The apparatus as in claim 19 further comprising means for transferring an overflow request over an integrated services digital network (ISDN) facility from the source automatic call distributor to the destination automatic call distributor including the call identifier of the source automatic call distributor.

21. The apparatus as in claim 19 further comprising means for transferring an overflow accept response from the destination automatic call distributor to the source automatic call distributor over an integrated services digital network (ISDN) facility.

22. The apparatus as in claim 19 further comprising means for overflowing the call over a private line between the source and destination automatic call distributors.

23. The apparatus as in claim 19 further comprising means for transferring a call arrival message from the destination automatic call distributor to the host computer including the call identifier assigned by the source automatic call distributor.

24. The apparatus as in claim 19 further comprising means for searching the overflow table using the call identifier of the source automatic call distributor to locate the identifier of the source automatic call distributor.

25. The apparatus of claim 24 wherein the means for locating the call record using the call identifier and located identifier of the source automatic call distributor further comprises means for searching an area of the memory reserved for the source automatic call distributor for the call record stored under the call identifier of the source automatic call distributor.

26. The apparatus of claim 19 further comprising means for receiving the telephone call from the PSTN at the source automatic call distributor, means for assigning the call identifier to the call and means for placing the call in a call queue.

27. The apparatus of claim 26 further comprising means for receiving call associated data from the PSTN.

28. The apparatus of claim 27 further comprising means for storing the call associated data in a termination table of the source automatic call distributor.

29. The apparatus of claim 27 further comprising means for transferring a call arrival message to the host computer including the call associated data received from the PSTN.

30. The apparatus of claim 29 further comprising means for creating the call record in an are of the memory reserved for the source automatic call distributor, the call record including at least the call associated data of the call arrival message.

31. The apparatus of claim 26 wherein the means for placing the call in a call queue further comprises means for selecting the call queue from a plurality of call queues.

32. The apparatus of claim 27 wherein the means for receiving call associated data from the PSTN further comprises means for receiving an output of an automatic number identification service as call associated data from the PSTN.

33. The apparatus of claim 32 further comprising means for selecting a call queue of a plurality of call queues based upon the output of the automatic number identification service.

34. The apparatus of claim 26 further comprising means for receiving an output of a dialed number identification service as call associated data from the PSTN.

35. The method of claim 34 further comprising means for selecting a call queue of a plurality of call queues based upon the output of the dialed number identification service.

36. The apparatus of claim 19 further comprising means for measuring a set of call parameters and determining that the call has met a call overflow criteria.

37. Apparatus for providing an address pointer to a host computer for a call record of a telephone call received from a public switched telephone network (PSTN) and overflowed from the source automatic call distributor to a destination automatic call distributor in a call distribution system using telescripted call control, the call record having been stored under a call identifier of the source automatic call distributor in a memory of the host computer serving both the source automatic call distributor and the destination automatic call distributor, such apparatus comprising:

a comparator which determines that a call attribute of the call has exceeded an overflow criteria; and a telescript processor coupled to the comparator which executes a call status telescript sequence by the source automatic call distributor when the comparator determines that the call attribute has exceeded the overflow criteria, said telescript sequence being adapted to enter a call identifier assigned by the source automatic call distributor and an identifier of the source automatic call distributor into a call overflow identification table of the host computer.

38. The apparatus as in claim 37 further comprising a source integrated services digital network (ISDN) communication processor which transfers an overflow request over an ISDN facility from the source automatic call distributor to the destination automatic call distributor including the call identifier of the source automatic call distributor.

39. The apparatus as in claim 37 further comprising a destination communication processor which transfers an overflow accept response from the destination automatic call distributor to the source automatic call distributor over an integrated services digital network (ISDN) facility.

40. The apparatus as in claim 37 further comprising a private line which provides an overflow communication path between the source and destination automatic call distributors.

41. The apparatus as in claim 37 further comprising a host communication processor which transfers a call arrival message from the destination automatic call distributor to the host computer including the call identifier assigned by the source automatic call distributor.

42. The apparatus as in claim 37 further comprising a search processor which searches the overflow table using the call identifier of the source automatic call distributor to locate the identifier of the source automatic call distributor.

43. The apparatus of claim 37 further comprising a PSTN interface processor which receives the telephone call from the PSTN at the source automatic call distributor, assigns the call identifier to the call and places the call in a call queue.

44. The apparatus of claim 43 further comprising a PSTN buffer which receives call associated data from the PSTN.

45. The apparatus of claim 44 further comprising a PSTN tracking processor which stores the call associated data in a termination table of the source automatic call distributor.

46. The apparatus of claim 44 further comprising a call record processor which transfers a call arrival message to the host computer including the call associated data received from the PSTN.

47. The apparatus of claim 43 wherein the PSTN interface processor which places the call in a call queue further comprises a call queue loading processor which selects the call queue from a plurality of call queues.

48. The apparatus of claim 37 further comprisesing an overflow tracking processor which measures a set of call parameters and determines that the call has met a call overflow criteria.

* * * * *